United States Patent [19]

Ritsema

[11] 4,345,675
[45] Aug. 24, 1982

[54] DISC BRAKE ASSEMBLY WITH LIGHTWEIGHT AND SPACE SAVING CHARACTERISTICS

[75] Inventor: Irving R. Ritsema, South Bend, Ind.
[73] Assignee: The Bendix Corporation, Southfield, Mich.
[21] Appl. No.: 127,708
[22] Filed: Mar. 6, 1980
[51] Int. Cl.³ .............................................. F16D 65/02
[52] U.S. Cl. ............................... 188/73.43; 188/72.4; 188/73.45; 188/73.47
[58] Field of Search ..................... 188/72.4, 73.3, 73.4, 188/73.31, 73.35, 73.43, 73.45, 73.47

[56] References Cited

U.S. PATENT DOCUMENTS

| | | | |
|---|---|---|---|
| 3,493,084 | 2/1970 | Maurice | 188/73.4 |
| 3,552,527 | 1/1971 | Hayes | 188/73.3 |
| 3,910,385 | 10/1975 | Gardner | 188/73.3 |
| 3,915,263 | 10/1975 | Courbot | 188/73.3 |
| 3,939,945 | 2/1976 | Habgood | 188/73.4 |
| 3,970,172 | 7/1976 | Gennes | 188/73.4 |
| 3,997,032 | 12/1976 | Kondo | 188/73.3 |

OTHER PUBLICATIONS

"Lightweight Disc Brakes for Small Cars", *Automotive Engineering*, vol. 85, No. 5, May 1977.

*Primary Examiner*—Edward R. Kazenske
*Attorney, Agent, or Firm*—Paul David Schoenle; Ken C. Decker

[57] ABSTRACT

A disc brake assembly includes a caliper assembly (20) which is movably mounted on a torque plate (14) to engage a pair of friction elements (26, 28) with a rotor (12). The caliper assembly defines a central opening (30) with abutment surfaces (32, 34) and the torque plate extends into the central opening to engage one of the abutment surfaces.

1 Claim, 3 Drawing Figures

DISC BRAKE ASSEMBLY WITH LIGHTWEIGHT AND SPACE SAVING CHARACTERISTICS

The present invention relates to a disc brake assembly wherein a rotor which is connected to a wheel assembly is engageable with a pair of friction elements to retard rotation of the rotor during braking. A torque plate movably carries a caliper assembly which is operable to urge the pair of friction elements into engagement with the rotor.

In response to the energy crisis, the automobile is continually being downsized and designed to accept lighter materials to increase efficiency, as measured in miles per gallon. However, the size of the disc or rotor must remain substantially large in diameter as the braking torque developed by the engagement of the friction elements with the rotor is dependent on the diameter of the rotor at the location of engagement. Disc brake assemblies such as illustrated in U.S. Pat. Nos. 3,442,353, 3,493,084 and 3,970,172 include steel caliper assemblies which are heavy and also spread out. Consequently, the efficiency or miles per gallon rating for automobiles with these disc brake assemblies are adversely affected by the latter.

The invention provides a disc brake assembly which accommodates a small clearance between the disc and a wheel. A caliper assembly includes a hydraulic actuator and a bridge. The bridge extends from the hydraulic actuator to a side of the rotor opposite the hydraulic actuator. A pair of flanges defined by the bridge form arcuate segments substantially parallel with and adjacent an outer periphery of the rotor. The bridge forms an opening with a pair of abutment surfaces and a torque plate extends into the opening to engage the abutment surfaces. The torque plate also includes an arm extending substantially across the rotor within the opening to engage one of the pair of abutment surfaces.

In one embodiment of the present invention, the bridge is made from a material which is different from the material of the hydraulic actuator and the material of the bridge defines a Brinell number less harder than for the hydraulic actuator. For example, the bridge is made from aluminum while the hydraulic actuator and torque plate are made from steel.

It is an advantageous effect of the present invention that the rotor diameter can be maintained sufficiently large to generate braking torque during braking while the caliper assembly can be disposed within a small clearance between the rotor and a wheel assembly. Also, the torque plate cooperates with the caliper assembly to absorb braking torque at a horizontal location substantially in line with a center for the hydraulic actuator. Consequently, bending forces developed during braking by the caliper assembly are substantially offset and the lining area for a pair of friction elements can be increased.

It is a further advantageous effect of the present invention that a lightweight disc brake assembly results from the different materials utilized in the construction of the caliper assembly.

One way of carrying out the invention is illustrated in the drawings which are described in detail below.

Figure 1:
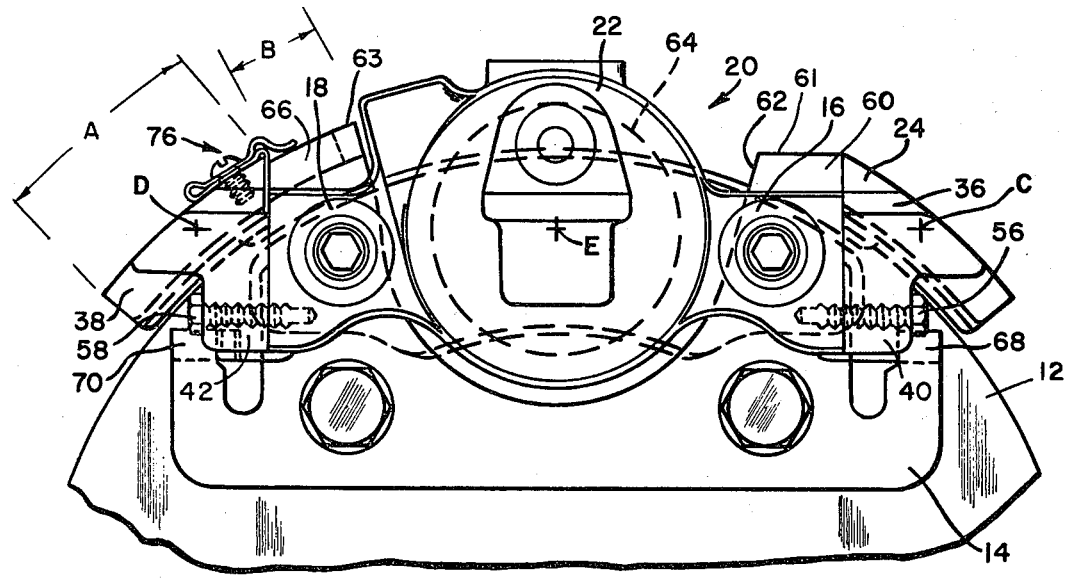
FIG. 1 is a front view of a disc brake assembly constructed in accordance with the present invention.

A wheel assembly, which is associated with a vehicle, is coupled to a rotor or disc 12 so that the wheel and rotor move in unison. A torque plate 14 is fixedly coupled to a non-rotatable portion of the vehicle and releasably supports a pair of pin assemblies 16 and 18. A caliper assembly 20 slidably engages the pin assemblies to be movably mounted relative to the torque plate 14 and rotor 12. The caliper assembly comprises a two-part assembly, one part being a hydraulic actuator 22 and a second part being a bridge 24. As is well known in the art, a pair of friction elements 26 and 28 are disposed on opposite sides of the rotor so that upon operation of the hydraulic actuator 22, the friction element 26 is urged directly into engagement with the rotor to develop a reaction force biasing the caliper assembly to move to a position engaging the friction element 28 with the rotor.

Figure 2:
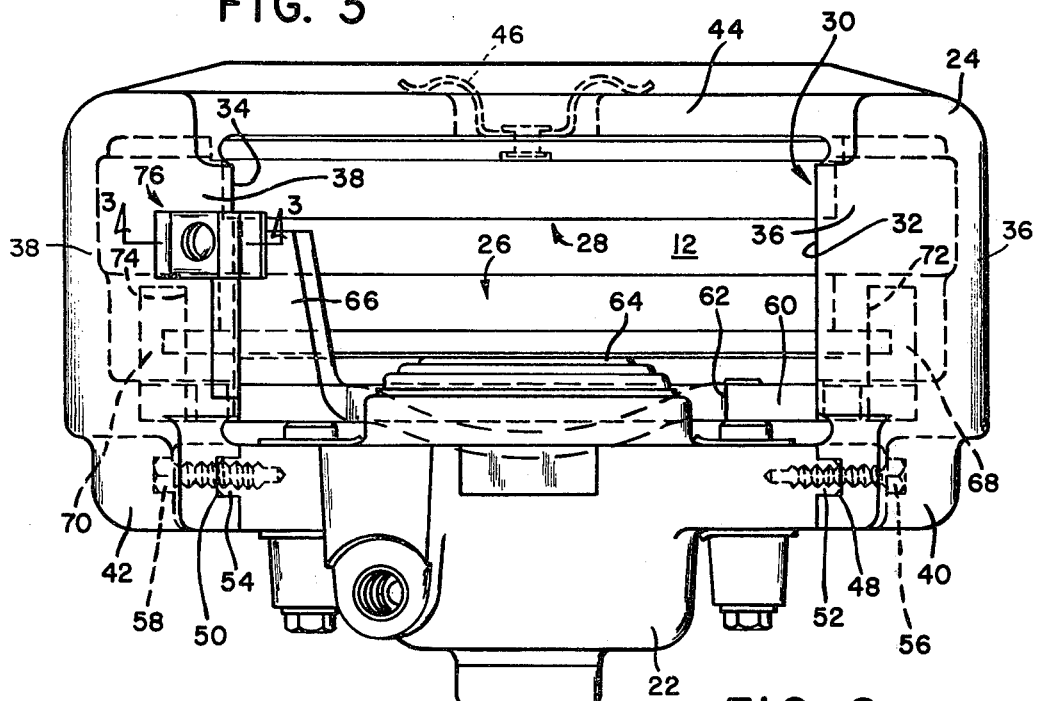
FIG. 2 is a top view of the disc brake assembly of FIG. 1.

In accordance with the invention, FIG. 2 shows the caliper assembly including a central opening 30 exposing the rotor. The wall of the opening includes a pair of abutment surfaces 32 and 34 arcuately spaced from each other. The pair of abutment surfaces are formed on axially extending, flanges 36 and 38 formed by the bridge part of the caliper assembly. The flanges 36 and 38 extend from separate inner legs 40 and 42 engaging the hydraulic actuator to a common outer leg 44 carrying the friction element 28 via suitable resilient means 46. The legs 40 and 42 include grooves 48 and 50, respectively, for receiving ridges 52 and 54 formed on the hydraulic actuator 22. The legs 40 and 42 are apertured to receive bolts 56 and 58 and the hydraulic actuator is provided with threaded bores at the ridges to releasably receive the bolts 56 and 58, thereby releasably coupling the bridge to the hydraulic actuator.

The torque plate 14 includes a first portion 60 which is parallel to the rotor 12 and provided with a cutout 62 for receiving a piston 64 of the hydraulic actuator 22. The cutout 62 forms a pair of separate radially extending sections 61 and 63 disposed outwardly of the rotor 12. A second portion 66 of the torque plate 14 extends axially from the first portion into the central opening 30 to slidably engage the abutment surface 34. The first portion slidably engages the abutment surface 34 and also the abutment surface 32. The second portion includes a decreasing transverse width from the first portion to the rotor 12. In addition, the torque plate 14 defines a pair of axially extending projections 68 and 70. The projections extend from the first portion 60 toward the rotor 12 to define abutment surfaces 72 and 74 which are engageable with the friction element 26 to absorb braking torque developed by the latter.

In order to reduce weight the bridge 24 is made from aluminum, while the hydraulic actuator can be made from a ferrous material, such as steel or iron. Because braking torque developed by the friction element 28 is transmitted through the aluminum bridge 24, the flange portions 36 and 38 of the bridge 24 substantially overlaying the rotor 12 includes an arcuate width A which is larger than the largest arcuate width B for the arm 66. Consequently, the shear forces transmitted during braking to the aluminum bridge 24 are spread over a larger volume of material for the aluminum bridge than the steel arm. Other materials are also possible in order to provide a lightweight construction for the disc assembly, for example, the torque plate, the bridge and hydraulic actuator could be made from either magnesium or composite plastics.

Figure 3:
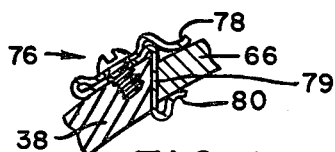
FIG. 3 is a cross-sectional view taken along line 3—3 of FIG. 2.

An optional stop 76 is disposed between the flange 38, associated with the leading or forward portion of the bridge, and the arm 66. The stop is secured to the flange 38, although it could also be secured to the arm 66, and includes top and bottom legs 78 and 80, see FIG. 3, engageable with the arm 66. The stop substantially eliminates radial movement between the flange 38 and the arm 66. In addition, the stop forms an abutment 79 which evenly distributes braking forces along the flange 38.

In FIG. 1, it is seen that the pair of projections 68 and 70 are located directly below the respective flanges 36 and 38. Moreover, the flange 36 defines a center of mass at C and the flange 38 defines a center of mass at D. These centroids define a line CD which preferably intersects the center of the axis for the piston 64 of the hydraulic actuator 22 at E.

Numerous modifications and/or changes to the aforegoing disc brake assembly are feasible by one skilled in the art. For example, the torque plate 14 could be an integral part of a knuckle in a vehicle and the two-part caliper assembly could be a single part. As such, these modifications and/or changes are includes within the scope of the appended claims.

1. A disc brake assembly with space saving characteristics comprising a torque plate (14) fixedly disposed relative to a rotor (12) to be braked, a caliper assembly (20, 22, 64) movably carried by the torque plate (14), a pair of friction elements (26, 28) cooperating with the caliper assembly (20) to frictionally engage the rotor (12) during braking, the caliper assembly (20, 22, 64) including a central opening (30) forming abutment surfaces (32, 34) the torque plate (14) including a first portion (60) parallel with the rotor (12) and extending into the central opening (30) to engage the abutment surfaces (32, 34) and a second portion (66) perpendicular to the rotor (14) and disposed substantially within the central opening (30), characterized by said torque plate first portion (60) defining a cut out (62) opening radially outwardly to receive a portion of said caliper assembly (22, 64) and also separating said first portion (60) into a pair of radially extending sections (61, 63) disposed within the central opening (30), said torque plate second portion (66) extending axially from only one of said radially extending sections to engage one of the abutment surfaces (32, 34) thereby preventing rotation of the caliper assembly in one direction, said torque plate second portion (66) comprising the only part of the torque plate extending perpendicularly within the central opening, said caliper assembly (20, 22, 64) including axially extending flanges (36, 38) overlaying said rotor (12), each of said flanges defining an arcuate width (A) which is larger than an arcuate width (B) defined by the entire portion of said torque plate second portion extending perpendicularly within the central opening (30), and said flanges (36, 38) having a radial dimension which is substantially equal to a radial dimension for said torque plate second portion (66), whereby the forces transmitted from one of said flanges (38) to said torque plate second portion (66), will be spread over a larger volume of material for said one flange (38) than said torque plate second portion (66), while at the same time maintaining the radial dimension for said one flange (38) substantially equal to the radial dimension for said torque plate second portion (66) to accommodate space limitations for the disc brake assembly.

* * * * *